United States Patent [19]

Hulsey et al.

[11] 4,453,699

[45] Jun. 12, 1984

[54] GATE AND SWING VALVE

[75] Inventors: Eldon E. Hulsey, Houston, Tex.; Burton T. Mast, 9419 Stockport, Spring, Tex. 77373

[73] Assignees: Michael P. Breston; Joe Lance Hulsey, both of Houston; Burton T. Mast, Spring, all of Tex.

[21] Appl. No.: 297,098

[22] Filed: Aug. 28, 1981

Related U.S. Application Data

[63] Continuation-in-part of Ser. No. 171,577, Jul. 23, 1980, abandoned.

[51] Int. Cl.³ ........................................... F16K 31/143
[52] U.S. Cl. .................................. 251/63.4; 251/166; 251/298; 137/516.25; 137/521
[58] Field of Search ................. 137/516.25, 516.27, 137/521; 251/62, 63.4, 167, 158, 298

[56] References Cited

U.S. PATENT DOCUMENTS

| | | | |
|---|---|---|---|
| 1,325,303 | 12/1919 | McGill | 251/198 |
| 2,073,727 | 3/1937 | Bodnovich | 251/158 |
| 3,139,811 | 7/1964 | Sickel | 137/521 X |
| 3,825,221 | 7/1974 | Smith | 251/62 |
| 4,256,283 | 3/1981 | Reneau | 251/62 |

Primary Examiner—Harold W. Weakley
Attorney, Agent, or Firm—Michael P. Breston

[57] ABSTRACT

The gate and swing valve has a body which defines at least one valve seat. A closure member inside the valve is pivotably mounted on a support. A cam and cam follower operatively couple the cam to the closure member. A stem has one end coupled to the cam for moving the closure member in a linear motion, in a swinging motion, and then in a linear motion toward the valve seat.

2 Claims, 20 Drawing Figures

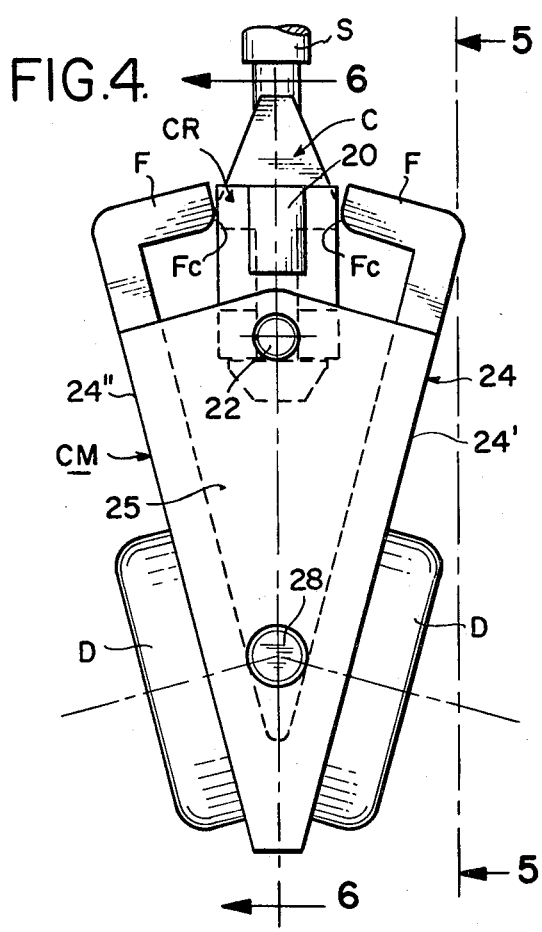
FIG. 4.
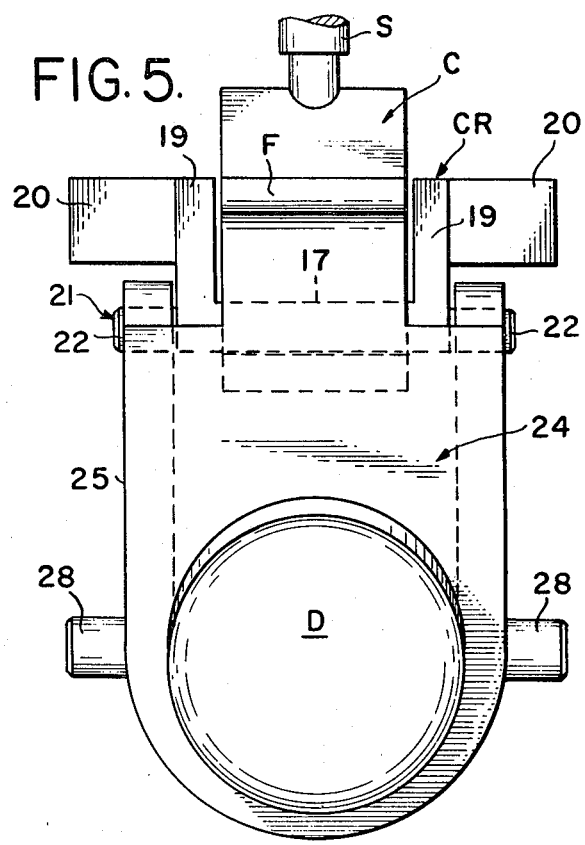
FIG. 5.
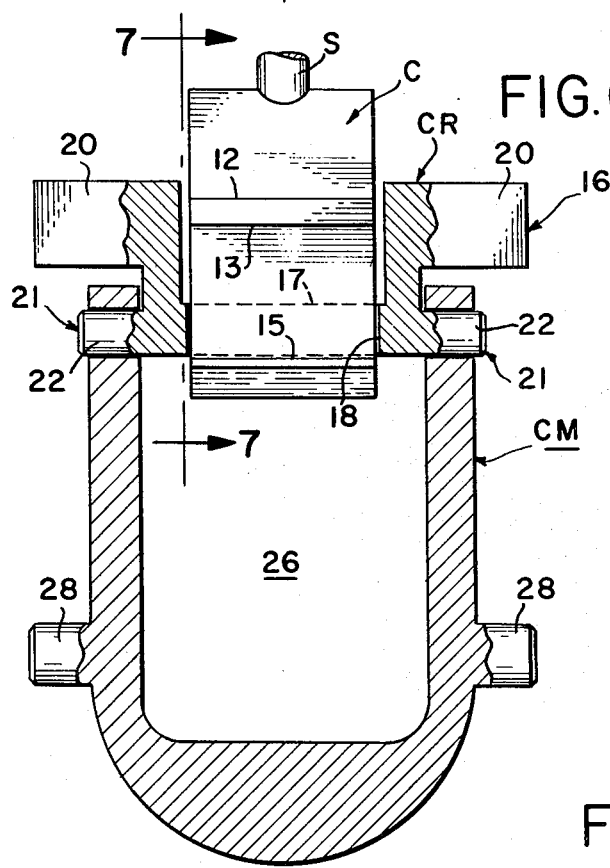
FIG. 6.
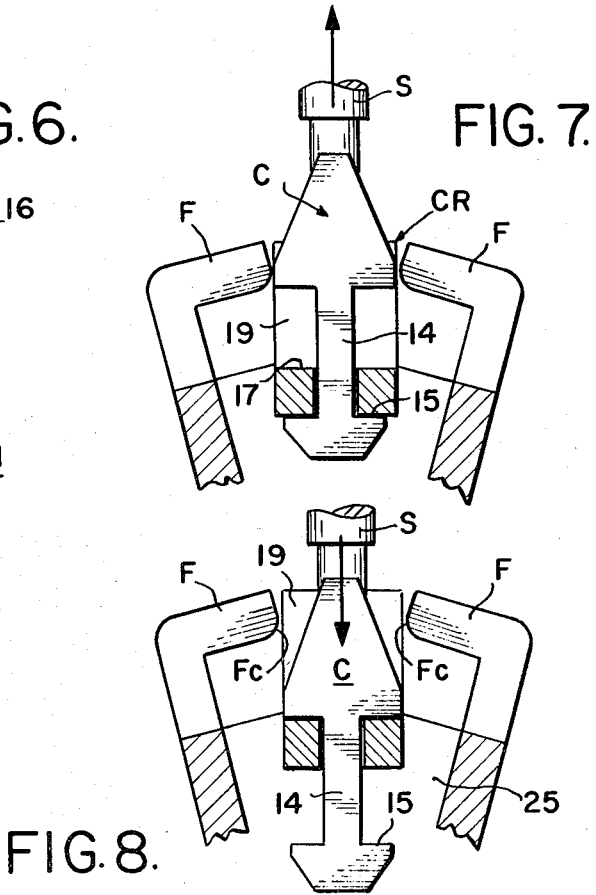
FIG. 7.
FIG. 8.

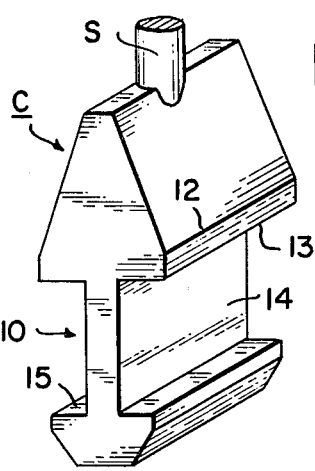
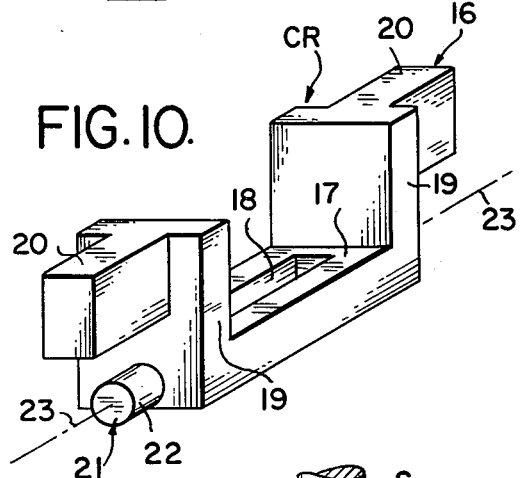
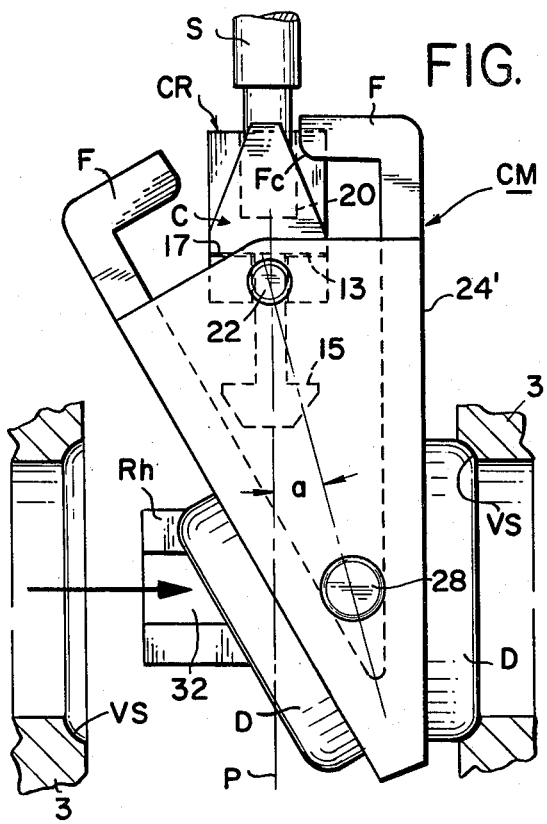
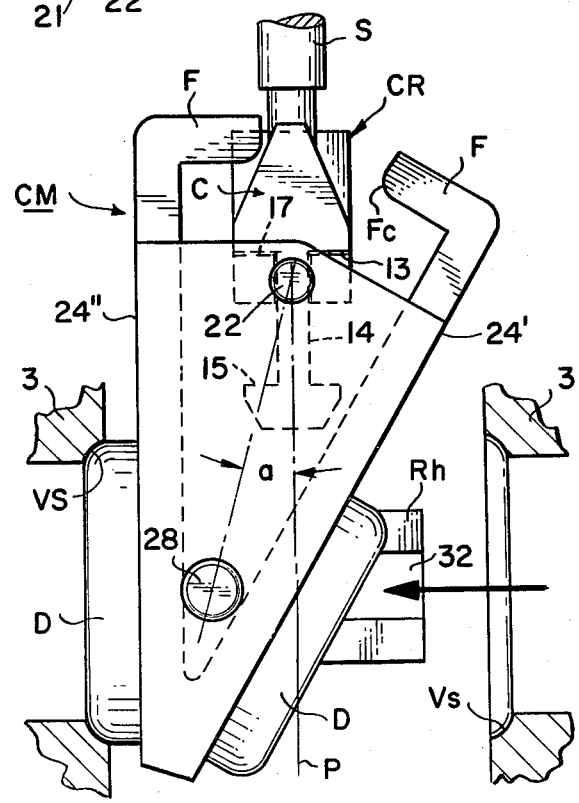
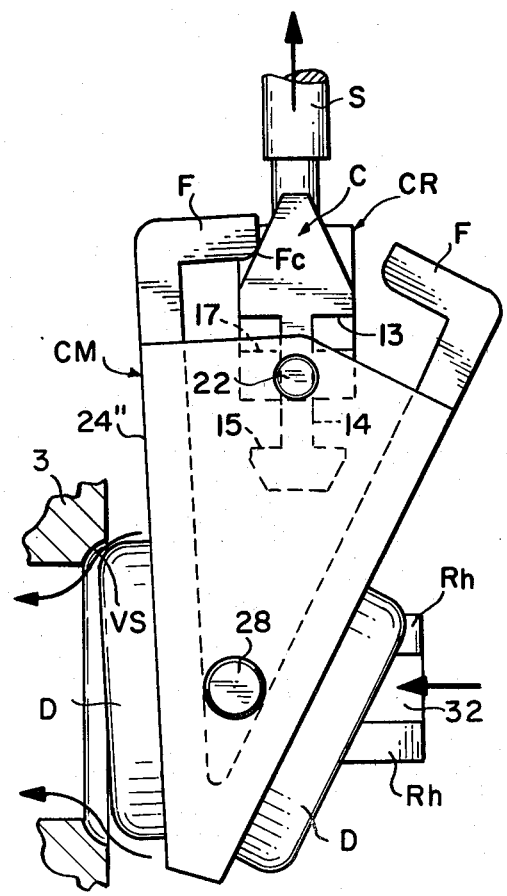
FIG. 9.
FIG. 10.
FIG. 11.
FIG. 12.
FIG. 13.

GATE AND SWING VALVE

REFERENCE TO RELATED APPLICATION

This application is a continuation-in-part of our co-pending application, Ser. No. 171,577, filed on July 23, 1980 and now abandoned.

BACKGROUND OF THE INVENTION

1. Field of the Invention

This invention relates to valves, such as pipeline valves, and more particularly to valves which can combine the advantages of gate valves and of swing check valves.

2. Description of the Prior Art

Various types of valves are known and used in the industry, such as gate valves, swing check valves, etc. Each type of valve is especially suited for a particular application, and is generally known for its advantages and disadvantages.

In U.S. Pat. No. 4,256,283 is shown a pivotal, spherical check valve which is relevant to applicants' invention. In this patent the ball valve has both a linear and rotational movement. It is believed that in such a structure, damage to the ball and to the valve seat will occur causing it to have a relatively short operational life.

In applicants' invention the closure member is non-spherical and has a linear movement followed by a rotational movement, and finally again by a linear movement. In this manner the closure member engages the valve seat substantially simultaneously.

It is a general object of this invention to provide a valve having a non-spherical closure member which moves linearly transversely to the fluid flow, then rotates toward the valve seat, and finally moves linearly parallel to the flowway to sealingly engage the valve seat substantially simultaneously. The closure member can be single-acting, i.e., it can swing in one direction only, or double-acting, that is, it can swing in one direction or in an opposite direction depending on the direction of fluid flow.

BRIEF SUMMARY OF THE INVENTION

The valve has an enclosed hollow body defining a flowway therethrough and a valve seat. An elongated stem is mounted to move toward and away from the flowway. Support means, including cam means, are operated by the stem. A non-spherical closure member is pivotably mounted on the support means. The stem and the cam means produce a controlled movement of the closure member resulting in a stem-controlled linear movement transversely to the flowway, followed by a cam-controlled swinging movement, and by a gradual cam-controlled linear movement parallel to the flowway until the closure member substantially instantaneously engages the valve seat.

In a preferred embodiment, the outer end portion of the stem sealingly and movably extends outwardly of the valve body. A cam extends inwardly from the inner end of the stem. A carriage extends inwardly from the cam. A cradle is movably mounted on the carriage. A wedge is hingedly mounted on and is supported by the cradle. The wedge includes a closure member and a cam follower. A rail is secured to the inside walls of the body. The cradle has first guides slidably mounted on the rail. The wedge has second guides slidably mounted on the rail. The closure member moves in a stem-controlled linear movement transversely to the flowway in response to the inward movement of the stem, then it moves in a cam-controlled swinging movement followed by a gradual cam-controlled linear movement parallel to the flowway until the closure member substantially instantaneously sealingly engages the valve seat.

BRIEF DESCRIPTION OF THE DRAWINGS

FIG. 4 is a side view in elevation of the wedge closure member, the cam, cam followers, carriage, and cradle; the closure member is hinged to the cam which is shown in its uppermost position from which the closure member is prevented from swinging in either direction by the cam followers;

FIG. 5 is a front view taken on line 5—5 of FIG. 4;

FIG. 6 is a sectional view taken on line 6—6 of FIG. 4;

FIG. 7 is a view taken on line 7—7 of FIG. 6;

FIG. 8 is a view similar to FIG. 7 but showing the valve stem pushing the cam to its lowermost position relative to the cradle and to the cam followers;

FIG. 9 is a view in perspective of the cam and of the carriage that serves to support the cradle;

FIG. 10 is a view in perspective of the cradle that supports the closure member;

FIG. 11 is a side view of the closure member with its right disc in full engagement with the right valve seat under the influence of line fluid pressure;

FIG. 12 is a side view similar to FIG. 11 except that the left disc is now in engagement with the left valve seat under the influence of line pressure;

FIG. 13 is similar to FIG. 12 but illustrating the disc as it becomes disengaged from the valve seat by gradual cam action produced by pulling the stem;

DETAILED DESCRIPTION OF PREFERRED EMBODIMENTS

Figure 1:
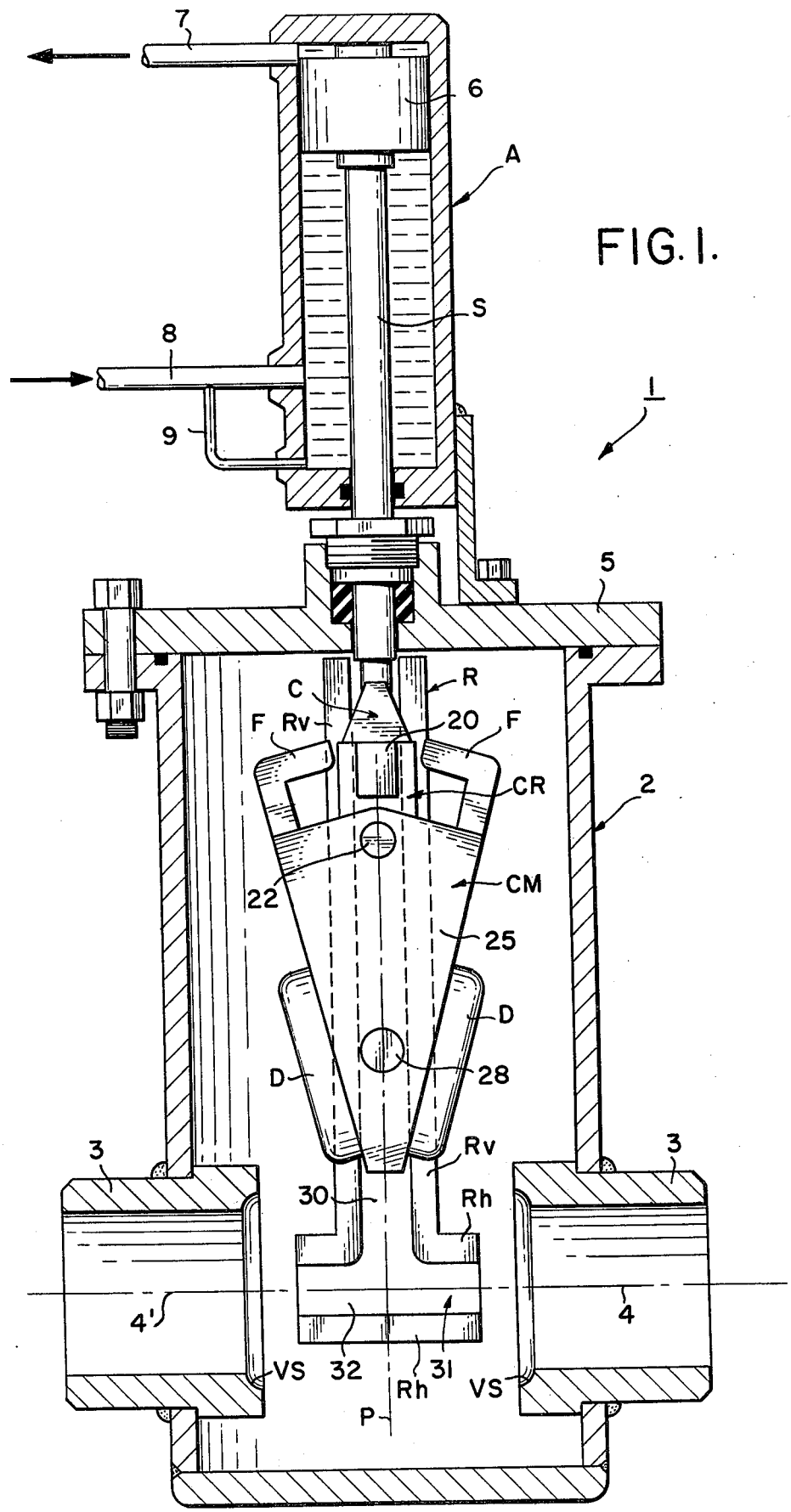
FIG. 1 is a sectional view in elevation of one embodiment of the valve of this invention, showing the closure member riding on the vertical rail toward its uppermost vertical position so as not to interfere with the fluid flow through the valve.
Figure 3:
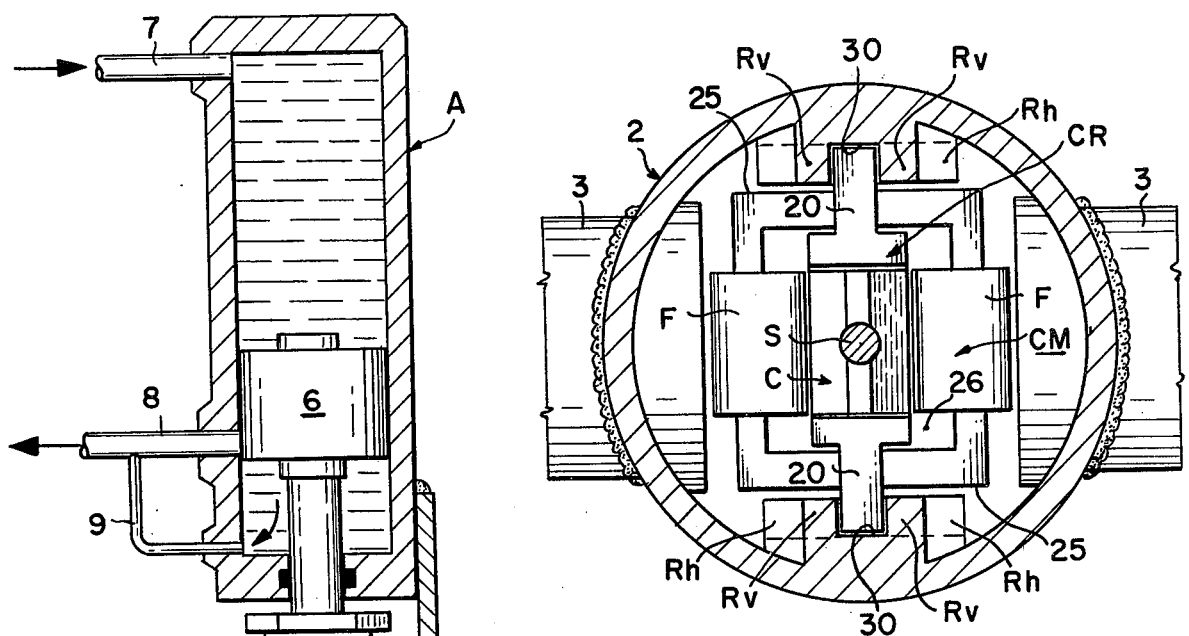
FIG. 3 is a sectional top view taken on line 3—3 of FIG. 2.

With reference to FIGS. 1-16, there is shown a double-acting, gate-swing valve, generally designated as 1 (FIG. 1). It includes a hydraulic actuator A having a stem S attached to a cam C which is associated with a pair of opposed cam followers F on a wedge closure member CM having a pair of discs D on the opposite front and rear faces thereof. Each disc D is adapted to engage a mating valve seat VS. The closure member CM is hinged to a cradle CR (FIG. 10) which rides on a rail R consisting of a vertical rail section Rv and a horizontal rail section Rh.

Valve 1 has a cylindrical body 2 provided with a pair of stud pipes 3 for coupling the valve to a pipeline in any suitable manner. Stub pipes 3 form a flowway 4 which has a longitudinal axis 4' that is perpendicular to the valve's transverse plane of symmetry P. A top crosshead 5 is bolted to the valve body 2. Stem S is slidably and sealingly mounted through the center of crosshead 5. The double-acting piston 6 of actuator A is attached to and moves the inner end of the stem. The actuator receives hydraulic fluid from a pair of hydraulic lines 7, 8. Line 8 has a bypass, restricted line 9 for a purpose subsequently described.

The outer end of stem S is attached to the center of cam C (FIG. 9) which is preferably wedge shaped and is characterized by a pair of front and rear sloping cam surfaces 11', 11. The cam has a gradually increasing triangular sectional area from the point of attachment to the stem down to its bottom base 12 which has a rectangular sectional area.

Cam C is coupled or attached to a carriage 10 which is adapted to carry the cradle CR. Carriage 10 has an I-shaped sectional area defined by an upper horizontal wall 13, a bottom horizontal wall 15, and a vertical center wall 14. Wall 14 has a reduced rectangular cross-sectional area and a predetermined height. Thus, stem S, cam C and carriage 10 form a unitary member which can push down on or lift-up the cradle CR and hence the closure member CM.

The cradle CR (FIG. 10) has a C-shaped longitudinal sectional area and consists of a bottom wall 17 having a rectangular sectional area, and a pair of upright end walls 19. Wall 17 defines a longitudinal rectangular center slot 18. Outwardly extending from cradle CR is a pawl member 16 which consists of a pair of projecting lugs or claw feet 20. Cradle CR has a hinge 21 formed by a pair of longitudinally-opposed pivot pins 22 having a longitudinal pivot axis 23.

The closure member CM is a double-acting, hollow wedge member 24 formed by two front and rear sloping walls 24', 24" and by two side or end walls 25. Wedge 24 has an inner open space 26 (FIG. 6). Each one of the sloping walls 24', 24" carries a disc D. Both discs D are symmetrically disposed relative to the transverse plane of symmetry P. Each top end of walls 24', 24" carries a cam follower F having a curved end surface Fc (FIG. 4) for engaging its mating cam wall 11' or 11.

A pair of outwardly-projecting, longitudinally-aligned retaining guides 28 (FIG. 5) extend from the side walls 25 of the closure member CM. Guides 28 are vertically spaced below pivots 22. Guides 28 ride on and are retained by the rail R (FIG. 1).

Rail R is formed by the vertical rail section Rv which consists of a pair of diametrically-opposed, vertical C-channels 30 which are bisected by the transverse plane of symmetry P, and by the horizontal rail section Rh which consists of a pair of diametrically-opposed, horizontal C-channels 32 which are bisected by the longitudinal plane containing axis 4'. Channels 30 and 32 form an inverted T-channel 31.

The cooperation between the various parts of valve 1 will now be described in greater detail. Center wall 14 of carriage 10 slidably extends through slot 18 of cradle CR. The maximum vertical displacement of cam C is determined by the height of wall 14 relative to the height of the bottom wall 17 of the cradle. The side walls 25 of closure member CM are pivotably mounted on the cradle's hinge 21 having a pivot axis 23. Thus, the closure member can swing in either direction about the pivot axis 23 by a maximum angle "a" from the transverse plane P (FIGS. 10-12). The claw feet 20 of the cradle CR can only ride within the channels 30 (FIG. 3) of the vertical rail Rv, while the retaining guides 28 of the closure member CM can ride both on the vertical rail Rv and on the horizontal rail Rh, that is, within channels 30 and 32.

Figure 2:
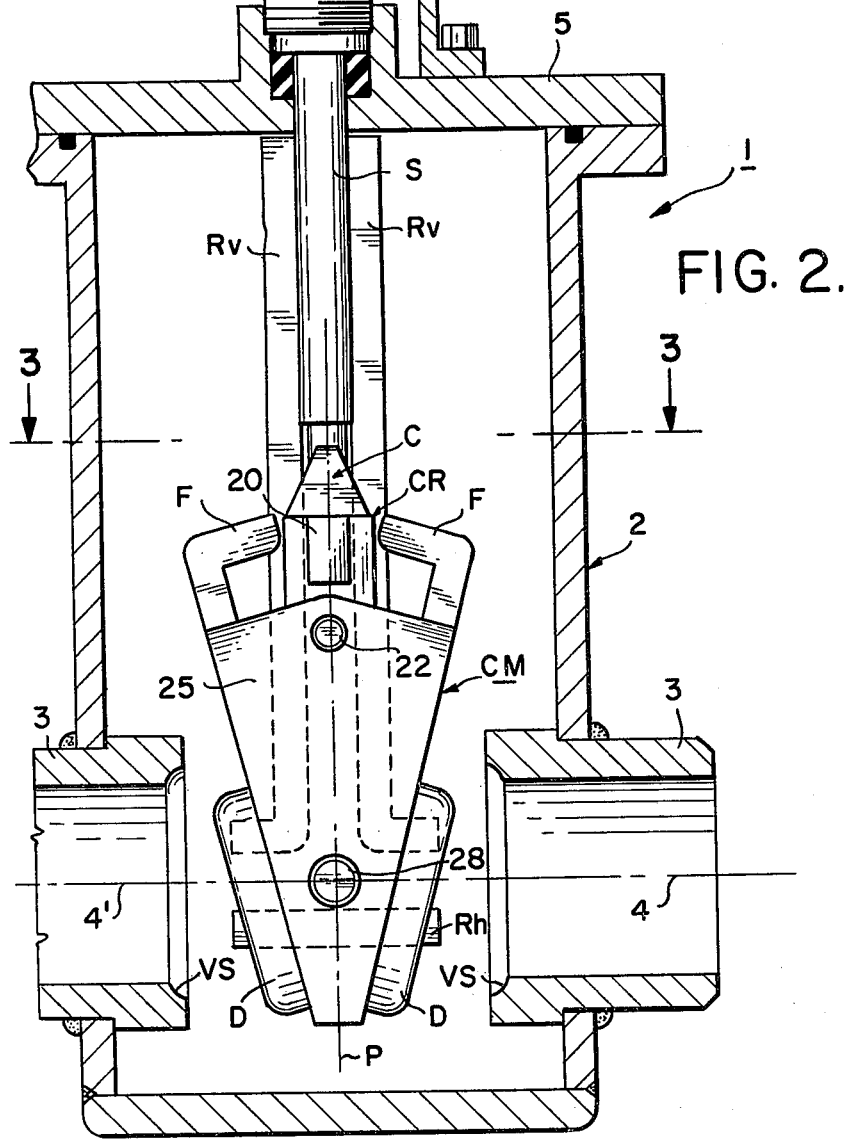
FIG. 2 is a view similar to FIG. 1 but with the closure member moving toward its lowermost vertical positon from which it is restrained from swinging towards either valve seat by cam action.
Figure 14:
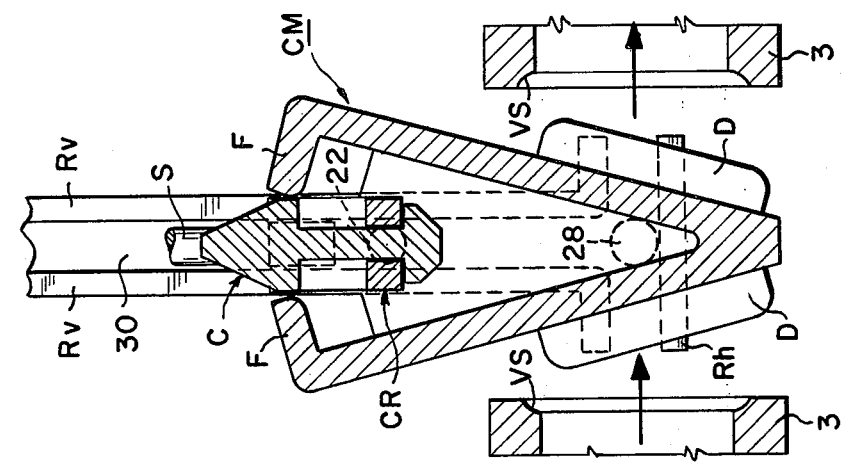
FIG. 14 is a sectional view of the closure member, the cam, the carriage, and the cradle, with the closure member being prevented by the cam from swinging in the direction of the line pressure.

In operation, the position of the closure member CM within the valve body 2 is at all times under the control of the valve's stem S and partially under the control of the cam C. When it is desired for the closure member to be completely out of the flowway 4, piston 6 is elevated to its uppermost position (FIG. 1). When it is desired for the closure member CM to become responsive to fluid flow in either direction, stem S is lowered vertically until the retaining guides 28 reach the horizontal rail Rh (FIGS. 2, 14). In this position, the closure member can swing in the direction of fluid flow, but only under the controlled cam action which is itself controlled by the movement of stem S.

To raise stem S to its uppermost position, hydraulic fluid pressure is supplied through line 8 (FIG. 1) to actuator A. When cam C is in its uppermost position relative to cradle CR, the bottom wall 17 of the cradle rests on and is supported by the bottom wall 15 of carriage 10 (FIGS. 1, 2, 4 and 14). Since the closure member CM is mounted on pivot pins 22 of the cradle, the closure member is also supported by wall 15 of carriage 10 until the retaining guides 28 rest on the horizontal rail Rh (FIGS. 2 and 14). In this position, the closure member is in its neutral position, i.e., it can move in either direction.

THE CLOSURE OF THE VALVE

Figure 15:
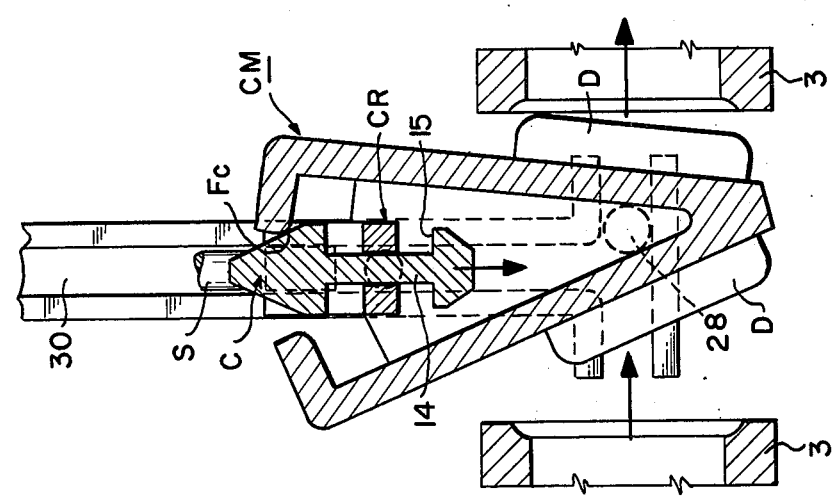
FIG. 15 is similar to FIG. 14 but with the cam starting to move to its lowermost position relative to the cradle, thereby allowing the right disc to swing towards the right valve seat.

When retaining guides 28 become supported by the horizontal rail, stem S can cause carriage 10 and hence cam C to move downwardly relative to cradle CR. The downward linear movement of the cam is limited by the upper wall 13 of carriage 10. The closure member can start swinging from its neutral position only under the influence of the line's fluid flow, but the angular velocity of the closure member is controlled by the linear velocity of cam C relative to one of the cam followers F (FIG. 15). The diameter of the bypass pipe 9 will assist in controlling the downward velocity of stem S near the end of its trajectory, since pipe 8 is then sealed off by piston 6 (FIG. 2). Finally, the closure member moves gradually and linearly parallel to the flowway until it substantially simultaneously engages the valve seat. In this manner, damage to the valve seat VS is minimized, as compared to the damage which may be done by a closure member which covers the valve seat gradually. Local concentrated forces are then produced on portions of the valve seat.

Figure 16:
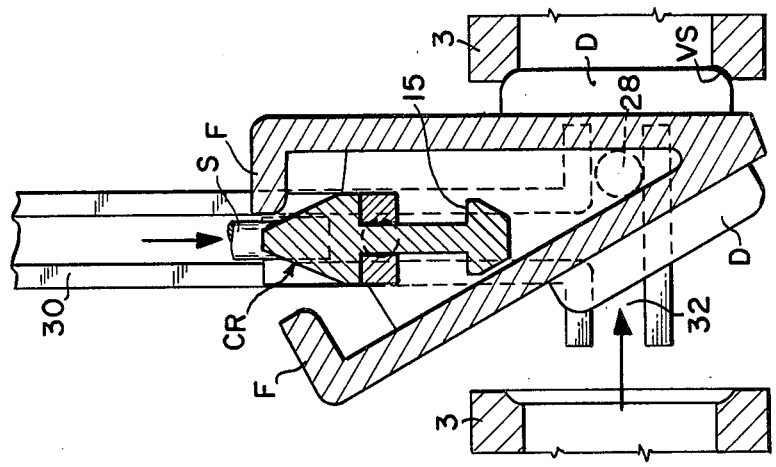
FIG. 16 is similar to FIG. 15 but showing the cam already in its lowermost position, the right disc in sealing engagement with the right valve seat, and the stem exerting pressure on the disc.

In FIGS. 11, 12 and 16 disc D is shown to be completely seated on its mating valve seat VS and can be maintained in that position by the line pressure or assisted by a downward force exerted by stem S on the carriage 10 and hence on the closure member CM. Thus, the effectiveness of the sealing engagement between the disc and its valve seat is reinforced by the actuator A.

THE OPENING OF THE VALVE

When it is desired to open the valve, stem S is raised (FIG. 13). As soon as cam C starts moving upwardly, a cam follower F will engage a cam surface 11 or 11', thereby causing disc D to swing away from its valve seat VS. The cam will continue to move up relative to the cam follower F until its motion is stopped by the bottom wall 15 of carriage 10 (FIG. 7), at which time both cam followers F become opposite to and locked by the base 12 of the cam, and the closure member is again at its neutral position, i.e., symmetrically disposed relative to the transverse plane P. Further upward movement of the stem will lift the closure member CM up and return it to its uppermost position (FIG. 1), which completes a full cycle of valve operation.

Figure 2A:
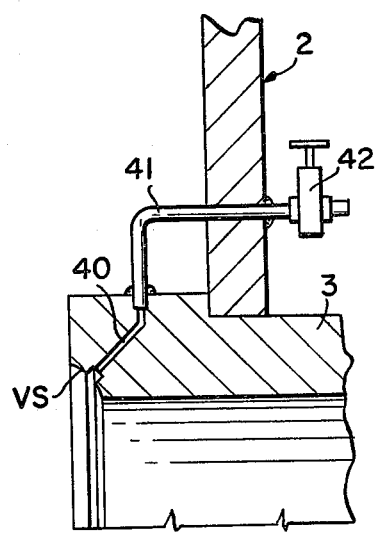
FIG. 2a shows a leakage detector for a valve seat.

In FIG. 2a is shown a detector which can test for leakage in the valve seats VS. For that purpose, there is provided a fluid channel 40 in the wall of pipe 3. A tube 41 extends through the wall of the valve's body 2 and interconnects a hand-operated valve 42 with channel 40. When it is desired to test for leakage, valve 42 is opened, and fluid leakage, if any, will flow therethrough.

Figure 17:
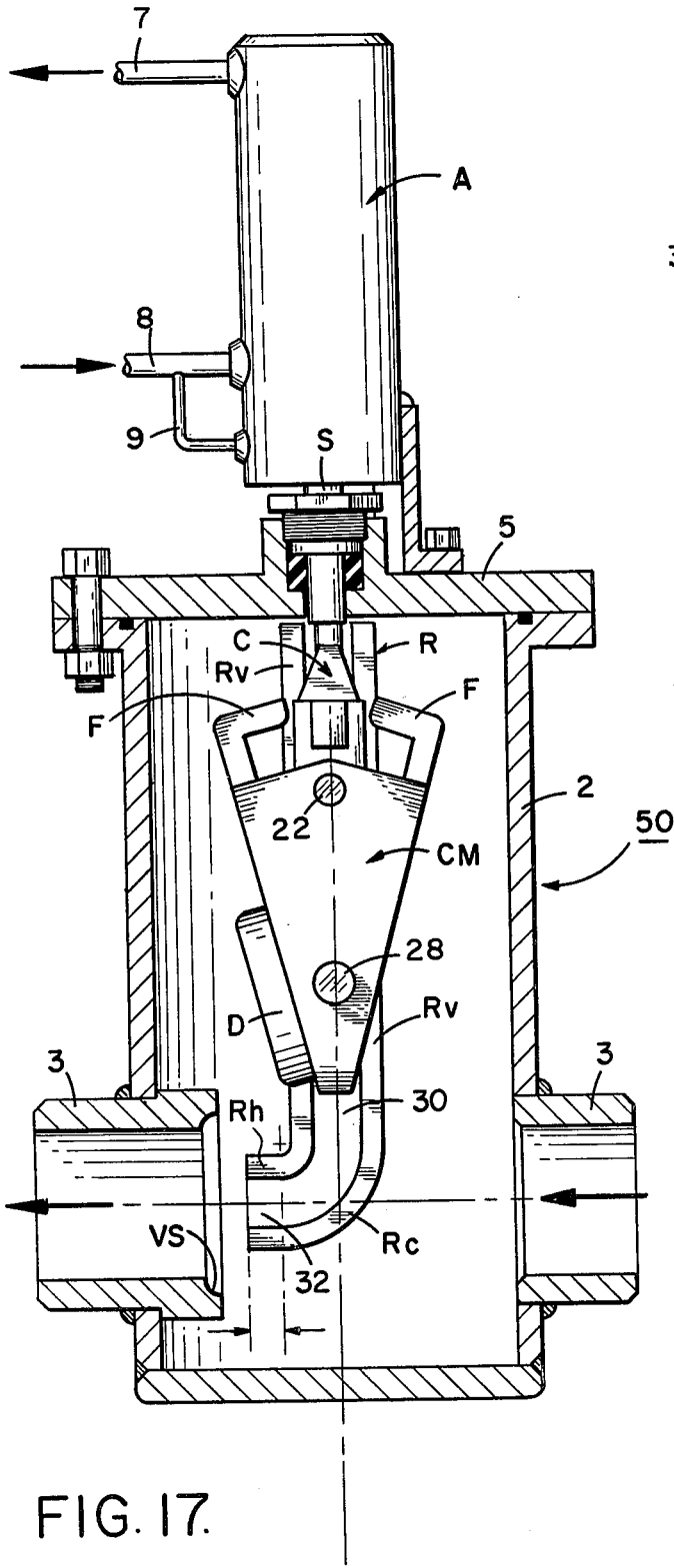
FIG. 17 is a side view in elevation of a modified embodiment of the valve of this invention showing a single-acting valve.
Figure 18:
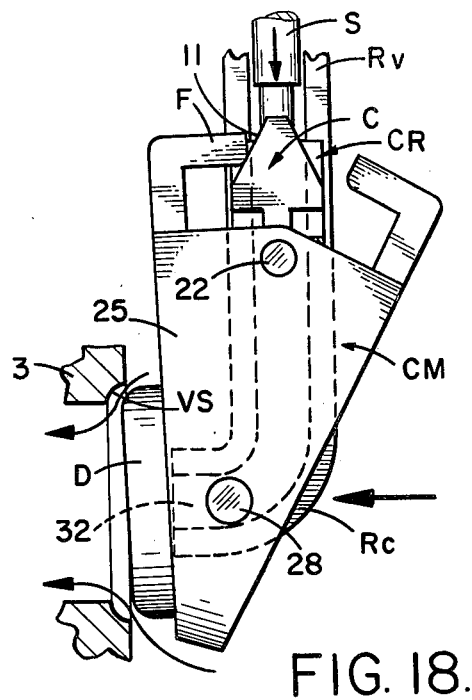
FIG. 18 is a side view of the valve of FIG. 17 showing the closure member in a position directly opposite to its valve seat.
Figure 19:
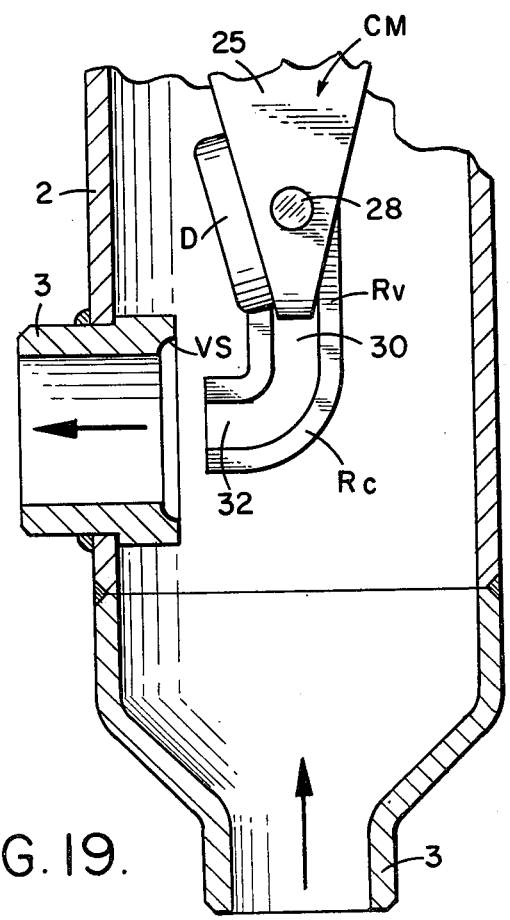
FIG. 19 shows the valve of FIG. 17 but with flow ports forming a right angle therebetween.

With reference to FIGS. 17-19, there is shown a single-acting, gate-swing, angle valve, generally designated as 50, wherein identical parts are labeled with the same reference characters as in FIGS. 10-16. The closure member CM now has only a single disc D adapted to engage a single valve seat VS. The cradle CR rides on a single rail R consisting of a vertical rail section Rv, a horizontal rail section Rh, and a curved rail section Rc. Thus, the rail channels 30, 32 instead of being at right angles, now have a smooth curvilinear track Rc therebetween.

Valve 50 has a cylindrical body 2 provided with a pair of stub pipes 3 for coupling the valve to a pipeline in any suitable manner. In FIG. 17, the stub pipes are coaxial, and in FIG. 19 the stub pipes have their axes at right angles. In FIG. 18 disc D is opposite to and near its mating seat VS.

The operation of the single-acting valve 50 is similar to that of the double-acting valve 1. In valve 50, the closure disc D can be moved also by stem S into forced closure engagement with its seat VS, as pins 28 are guided through the curved rail section Rc. Fluid line pressure only assists in maintaining valve closure between disc D and its seat VS. Thus, angle valve 50 of this invention is especially suited for applications wherein the pressure differential across the closure disc D can vay in either direction.

What is claimed is:

1. A valve for controlling the fluid flow therethrough, comprising:
    a fluid-operated actuator including an elongated stem;
    a valve body defining a longitudinal flowway therethrough and having a pair of opposed valve seats;
    a cam extending inwardly from the inner end of said stem;
    a carriage extending inwardly from said cam;
    a cradle mounted on said carriage for relative movement therebetween;
    a wedge-shaped closure member hingedly supported by said cradle and having a pair of opposed followers operatively associated with said cam;
    a rail having a vertical portion and a horizontal portion;
    said cradle having a pawl member adapted to ride on said vertical rail portion; and
    said closure member having a pair of guides adapted to cause said closure member to ride on said vertical rail portion when both said pawl member and said guides ride on said vertical rail portion, and said closure member being free to swing and then to linearly move under the influence of fluid flow toward either valve seat when the innermost one of said guides rides on said horizontal rail portion.

2. The valve according to claim 1, wherein said actuator is outside of said valve body and said stem slidably and sealingly extends through said valve body.

* * * * *